US012670689B2

(12) United States Patent
Chi et al.

(10) Patent No.: US 12,670,689 B2
(45) Date of Patent: Jun. 30, 2026

(54) SPATIAL ACTION LOCALIZATION IN THE FUTURE (SALF)

(71) Applicant: Honda Motor Co., Ltd., Tokyo (JP)

(72) Inventors: Hyung-Gun Chi, West Lafayette, IN (US); Kwonjoon Lee, San Jose, CA (US); Nakul Agarwal, San Francisco, CA (US); Yi Xu, Boston, MA (US); Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 18/300,844

(22) Filed: Apr. 14, 2023

(65) Prior Publication Data

US 2024/0161447 A1     May 16, 2024

Related U.S. Application Data

(60) Provisional application No. 63/424,535, filed on Nov. 11, 2022.

(51) Int. Cl.
G06V 10/44 (2022.01)
G06N 3/0464 (2023.01)

(52) U.S. Cl.
CPC ......... G06V 10/454 (2022.01); G06N 3/0464 (2023.01)

(58) Field of Classification Search
CPC .... G06V 10/454; G06V 10/82; G06N 3/0464; G06N 3/0442; G06N 3/0455; G06N 3/0499; G06N 3/088; G06N 3/09
See application file for complete search history.

(56) References Cited

U.S. PATENT DOCUMENTS

| | | | |
|---|---|---|---|
| 2021/0357647 A1* | 11/2021 | Na | G06N 3/045 |
| 2022/0292266 A1* | 9/2022 | Dey | G06N 3/0455 |
| 2023/0038673 A1* | 2/2023 | Masoud | B60W 30/095 |

OTHER PUBLICATIONS

Memory Augmented Models, Fernando et al 2019 (Year: 2019).*
Ricky TQ Chen, Yulia Rubanova, Jesse Bettencourt, and David K Duvenaud. Neural ordinary differential equations. Advances in neural information processing systems, 31, 2018.
Rohit Girdhar and Kristen Grauman. Anticipative video transformer. In Proceedings of the IEEE/CVF International Conference on Computer Vision, pp. 13505-13515, 2021.

(Continued)

*Primary Examiner* — Jianxun Yang
(74) *Attorney, Agent, or Firm* — Rankin, Hill & Clark LLP

(57) ABSTRACT

According to one aspect, spatial action localization in the future (SALF) may include feeding a frame from a time step of a video clip through an encoder to generate a latent feature, feeding the latent feature and one or more latent features from one or more previous time steps of the video clip through a future feature predictor to generate a cumulative information for the time step, feeding the cumulative information through a decoder to generate a predicted action area and a predicted action classification associated with the predicted action area, and implementing an action based on the predicted action area and the predicted action classification. The encoder may include a 2D convolutional neural network (CNN) and/or a 3D-CNN. The future feature predictor may be based on an ordinary differential equation (ODE) function.

17 Claims, 6 Drawing Sheets

(56) References Cited

OTHER PUBLICATIONS

Vincent Le Guen and Nicolas Thome. Disentangling physical dynamics from unknown factors for unsupervised video prediction. In Proceedings of the IEEE/CVF Conference on Computer Vision and Pattern Recognition, pp. 11474-11484, 2020.

Kensho Hara, Hirokatsu Kataoka, and Yutaka Satoh. Can spatiotemporal 3d cnns retrace the history of 2d cnns and imagenet? In Proceedings of the IEEE conference on Computer Vision and Pattern Recognition, pp. 6546-6555, 2018.

Okan Köpüklü, Xiangyu Wei, and Gerhard Rigoll. You only watch once: A unified cnn architecture for realtime spatiotemporal action localization. arXiv preprint arXiv:1911.06644, 2019.

Tianwei Lin, Xiao Liu, Xin Li, Errui Ding, and Shilei Wen. Bmn: Boundary-matching network for temporal action proposal generation. In Proceedings of the IEEE/CVF international conference on computer vision, pp. 3889-3898, 2019.

Joseph Redmon and Ali Farhadi. Yolo9000: better, faster, stronger. In Proceedings of the IEEE conference on computer vision and pattern recognition, pp. 7263-7271, 2017.

Yulia Rubanova, Ricky TQ Chen, and David K Duvenaud. Latent ordinary differential equations for irregularlysampled time series. Advances in neural information processing systems, 32, 2019.

Xingjian Shi, Zhourong Chen, Hao Wang, Dit-Yan Yeung, Wai-Kin Wong, and Wang-chun Woo. Convolutional lstm network: A machine learning approach for precipitation nowcasting. Advances in neural information processing systems, 28, 2015.

Gurkirt Singh, Suman Saha, Michael Sapienza, Philip HS Torr, and Fabio Cuzzolin. Online real-time multiple spatiotemporal action localisation and prediction. In Proceedings of the IEEE International Conference on Computer Vision, pp. 3637-3646, 2017.

Ashish Vaswani, Noam Shazeer, Niki Parmar, Jakob Uszkoreit, Llion Jones, Aidan N Gomez, Łukasz Kaiser, and Illia Polosukhin. Attention is all you need. Advances in neural information processing systems, 30, 2017.

* cited by examiner

200

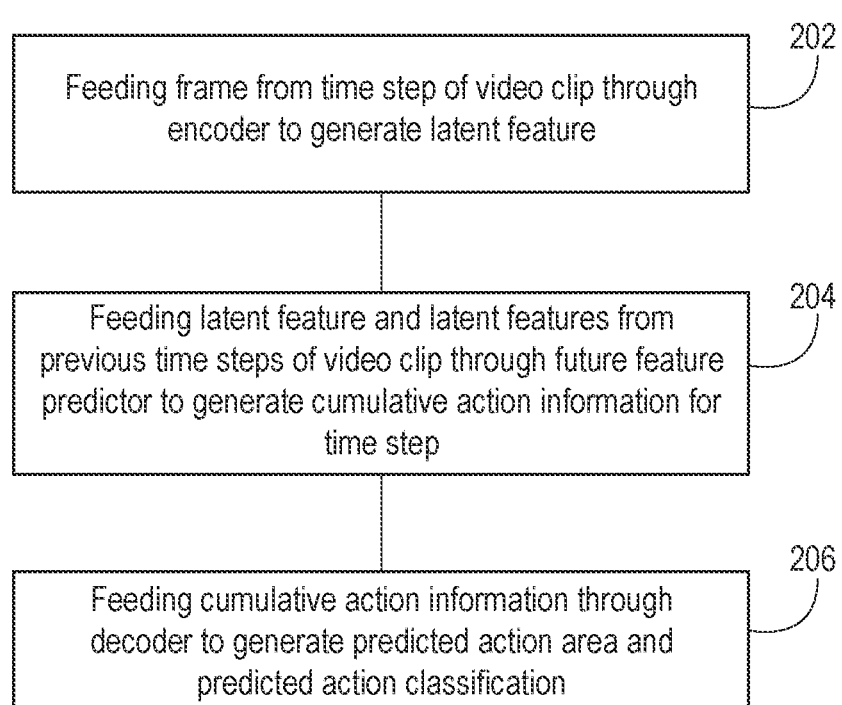

| |
|---|
| Feeding frame from time step of video clip through encoder to generate latent feature |

202

| |
|---|
| Feeding latent feature and latent features from previous time steps of video clip through future feature predictor to generate cumulative action information for time step |

204

| |
|---|
| Feeding cumulative action information through decoder to generate predicted action area and predicted action classification |

SPATIAL ACTION LOCALIZATION IN THE FUTURE (SALF)

CROSS-REFERENCE TO RELATED APPLICATIONS

This application claims the benefit of U.S. Provisional Patent Application, Ser. No. 63/424,535 entitled "SYSTEM AND METHOD FOR PROVIDING SPATIO-TEMPORAL ACTION LOCALIZATION IN THE FUTURE", filed on Nov. 11, 2022; the entirety of the above-noted application(s) is incorporated by reference herein.

BACKGROUND

Human actions are one of the most important topics in computer vision that may be used in various applications, especially for applications to assist humans. These applications aim to assist users by understandings users' intentions or perceiving human action, which include computer vision tasks, such as action recognition and temporal localization. Recently, the tasks of predicting the future have been spotlighted due to a desire to prepare for future events. However, despite the recent effort to predict the future of human action, existing computer vision tasks are limited to applications for assisting humans since anticipating action locations is critical for these applications.

BRIEF DESCRIPTION

According to one aspect, a system for spatial action localization in the future (SALF) may include a processor and a memory. The memory may store one or more instructions. The processor may execute one or more of the instructions stored on the memory to perform one or more acts, actions, or steps. For example, the processor may perform feeding a frame from a time step of a video clip through an encoder to generate a latent feature, feeding the latent feature and one or more latent features from one or more previous time steps of the video clip through a future feature predictor to generate a cumulative information for the time step, and feeding the cumulative information through a decoder to generate a predicted action area and a predicted action classification associated with the predicted action area.

The processor may implement an action based on the predicted action area and the predicted action classification. The frame from the time step of the video clip may be a predicted future frame. The feeding the frame from the time step of the video clip through the encoder to generate the latent feature may include feeding the frame from the time step of the video clip through a 2-dimensional (2D) neural network to generate a first output, feeding the frame from the time step of the video clip through a 3-dimensional (3D) neural network to generate a second output, and concatenating the first output and the second output to generate the latent feature. The 2D neural network may be a 2D convolutional neural network (CNN). The 3D neural network may be a 3D convolutional neural network (CNN).

The future feature predictor may generate the cumulative information for the time step by extrapolating the latent feature from the time step and one or more of the latent features from one or more of the previous time steps of the video clip to a future time horizon. The future feature predictor may generate the cumulative information for the time step by extrapolating the latent feature based on an ordinary differential equation (ODE) function. The ODE function may be modeled using self-attention or multi-head attention. The feeding the latent feature and one or more of the latent features from one or more of the previous time steps of the video clip through the future feature predictor to generate the cumulative information for the time step may include feeding all of the latent features from all of the previous time steps of the video clip through the future feature predictor.

According to one aspect, a computer-implemented method for spatial action localization in the future (SALF) may include feeding a frame from a time step of a video clip through an encoder to generate a latent feature, feeding the latent feature and one or more latent features from one or more previous time steps of the video clip through a future feature predictor to generate a cumulative information for the time step, and feeding the cumulative information through a decoder to generate a predicted action area and a predicted action classification associated with the predicted action area.

The feeding the frame from the time step of the video clip through the encoder to generate the latent feature may include feeding the frame from the time step of the video clip through a 2-dimensional (2D) neural network to generate a first output, feeding the frame from the time step of the video clip through a 3-dimensional (3D) neural network to generate a second output, and concatenating the first output and the second output to generate the latent feature. The 2D neural network may be a 2D convolutional neural network (CNN). The 3D neural network may be a 3D convolutional neural network (CNN). The future feature predictor may generate the cumulative information for the time step by extrapolating the latent feature from the time step and one or more of the latent features from one or more of the previous time steps of the video clip to a future time horizon. The future feature predictor may generate the cumulative information for the time step by extrapolating the latent feature based on an ordinary differential equation (ODE) function.

According to one aspect, a system for spatial action localization in the future (SALF) may include a processor, a memory, and a controller. The memory may store one or more instructions. The processor may execute one or more of the instructions stored on the memory to perform one or more acts, actions, or steps. For example, the processor may perform feeding a frame from a time step of a video clip through an encoder to generate a latent feature, feeding the latent feature and one or more latent features from one or more previous time steps of the video clip through a future feature predictor to generate a cumulative information for the time step, and feeding the cumulative information through a decoder to generate a predicted action area and a predicted action classification associated with the predicted action area. The controller may control an actuator to implement an action based on the predicted action area and the predicted action classification.

The feeding the frame from the time step of the video clip through the encoder to generate the latent feature may include feeding the frame from the time step of the video clip through a 2-dimensional (2D) neural network to generate a first output, feeding the frame from the time step of the video clip through a 3-dimensional (3D) neural network to generate a second output, and concatenating the first output and the second output to generate the latent feature. The 2D neural network may be a 2D convolutional neural network (CNN). The 3D neural network may be a 3D convolutional neural network (CNN).

BRIEF DESCRIPTION OF THE DRAWINGS

FIG. 2 is an exemplary flow diagram of a computer-implemented method for spatial action localization in the future (SALF), according to one aspect.

DETAILED DESCRIPTION

Figure 1:
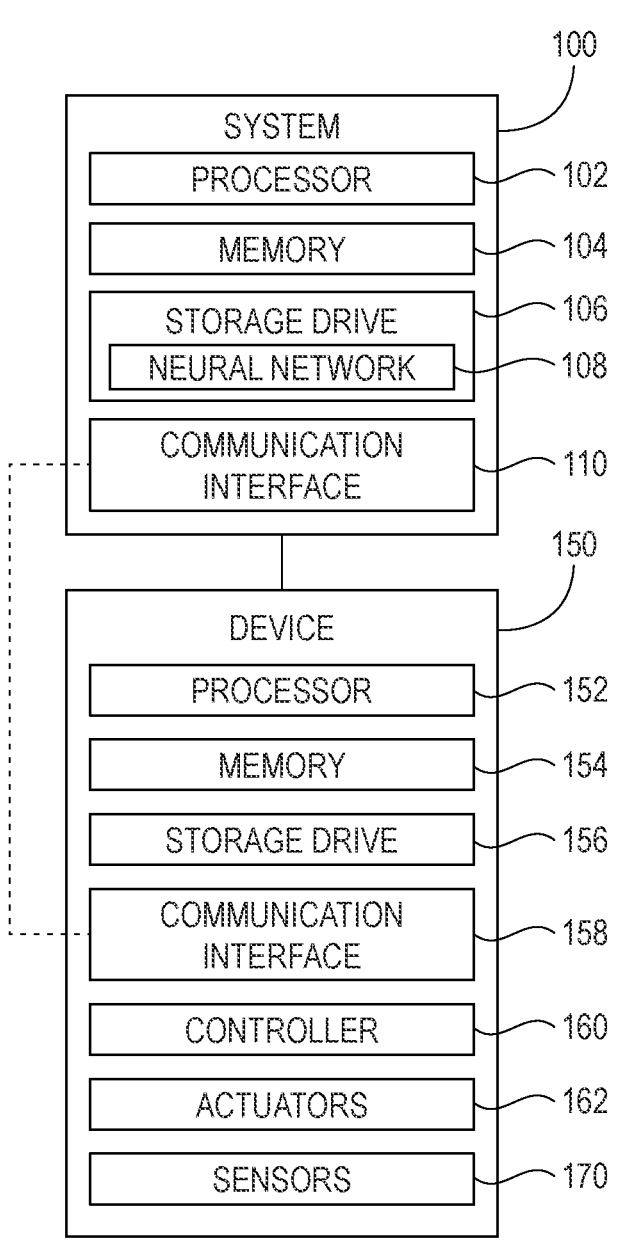
FIG. 1 is an exemplary component diagram of a system for spatial action localization in the future (SALF), according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "robot", as used herein, may be a machine, such as one programmable by a computer, and capable of carrying out a complex series of actions automatically. A robot may be guided by an external control device or the control may be embedded within a controller. It will be appreciated that a robot may be designed to perform a task with no regard to appearance. Therefore, a 'robot' may include a machine which does not necessarily resemble a human, including a vehicle, a device, a flying robot, a manipulator, a robotic arm, etc.

A "robot system", as used herein, may be any automatic or manual systems that may be used to enhance robot performance. Exemplary robot systems include a motor system, an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a suspension system, an audio system, a sensory system, among others.

FIG. 1 is an exemplary component diagram of a system 100 for spatial action localization in the future (SALF), according to one aspect. The system 100 for SALF may include a processor 102, a memory 104, a storage drive 106 storing a neural network 108, and a communication interface 110. The memory 104 may store one or more instructions. The processor 102 may execute one or more of the instructions stored on the memory 104 to perform one or more acts, actions, or steps. One or more of the components of the system 100 for SALF may be connected via a bus which facilitates computer communication or forms an operable connection between respective components. The system 100 for SALF may be in computer communication or be communicatively coupled to a device 150 which may or may not be included in the system 100 for SALF.

The device 150 may include a processor 152, a memory 154, a storage drive 156, a communication interface 158, a controller 160, an actuator 162, and a sensor 170. One or more of the components of the device may be connected via a bus which facilitates computer communication or forms an operable connection between respective components. The device may be a mobile device, a vehicle including one or more vehicle systems, a robot including one or more robot systems, etc. The device may be in computer communication with the system 100 for SALF via the communication interface 110(s). Additionally, the processor 102 of the system 100 for SALF may be implemented as an encoder, a future feature predictor, a decoder, or as any of the components of the architectures 300, 400 of FIGS. 3-4, etc.

Generally, the system 100 for SALF may predict and localize a spatial location of actions for both one or more observation frames and for one or more future frames, which may be predicted frames. Stated another way, the system 100 for SALF may localize spatial boundaries of actions that appear in the long-term future as well as in past observations. The system 100 for SALF may extrapolate one or more latent states of observed frames and/or future frames to future time horizons by modeling continuous temporal dynamics of latent states. The extrapolation of one or more of the latent states may be achieved by solving an ordinary differential equation (ODE) function using an Adams method.

Notably, SALF may be distinguished from action anticipation, which predicts future action categories in that SALF may spatially localize the actions. Unlike action anticipation, in SALF, a single frame may include multiple actions since multiple subjects may conduct different actions simultaneously or concurrently. Therefore, the architectures 300, 400 provided herein may provide the benefit or advantage of predicting rich information about the future frame to spatially localize multiple actions.

Figure 3:
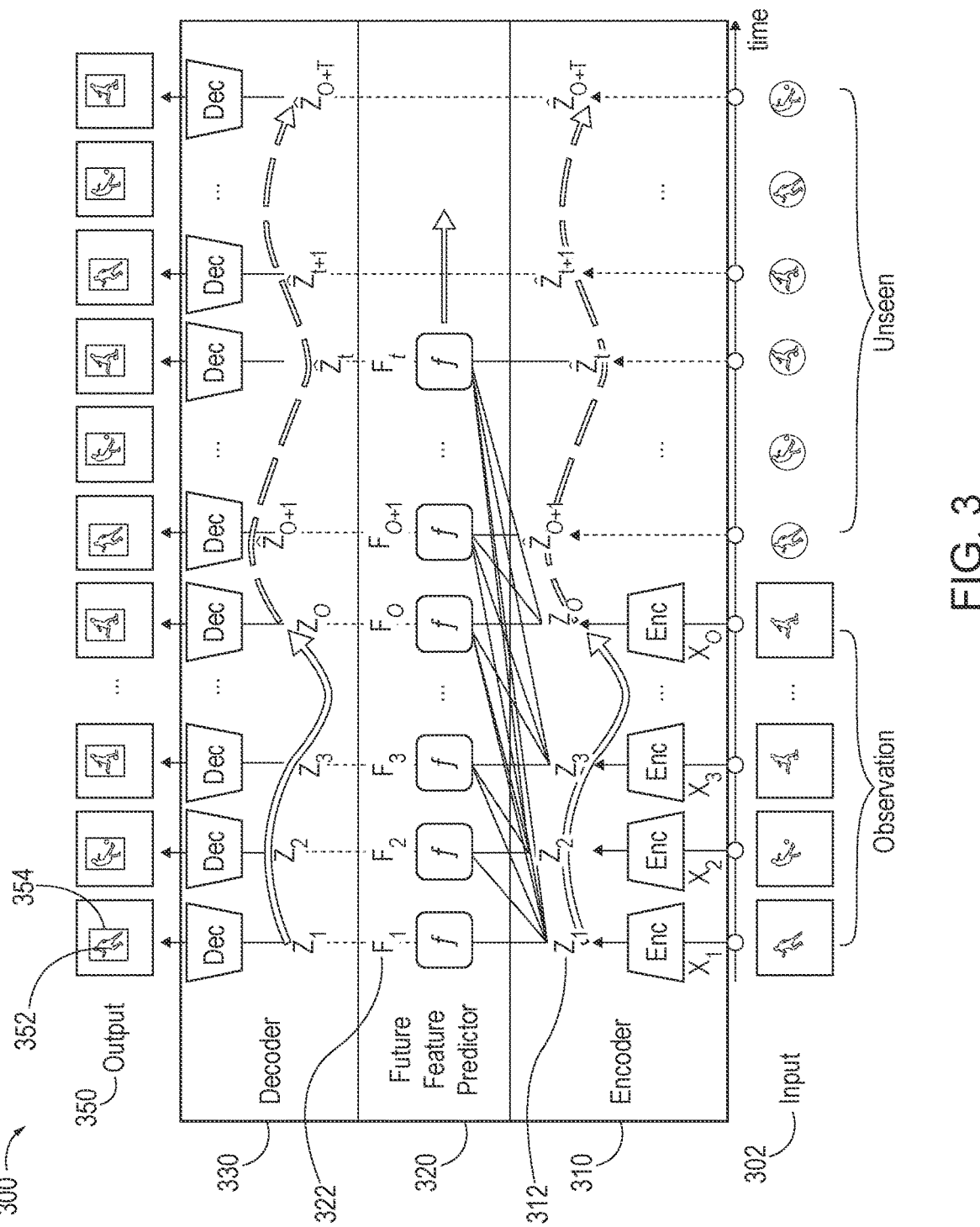
FIG. 3 is an exemplary architecture in associated with the component diagram of the system for spatial action localization in the future (SALF) of FIG. 1, according to one aspect.
Figure 4:
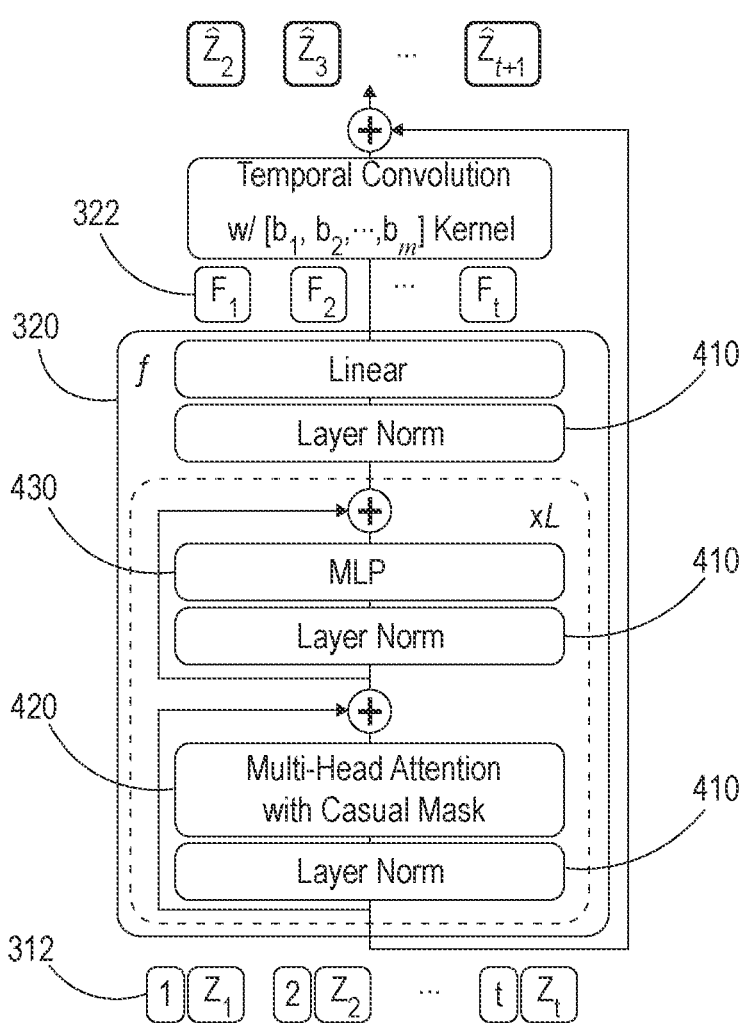
FIG. 4 is an exemplary architecture in associated with the component diagram of the system for spatial action localization in the future (SALF) of FIG. 1, according to one aspect.

AdamsFormer architecture 300, which will be discussed in greater detail with respect to FIGS. 3-4, is provided herein. This architecture 300 may be designed to detect spatial action tubes from the observed frame and also predict spatial action for future frames. The AdamsFormer architecture 300 may predict future action locations by extrapolating observed frames' latent features to the future time horizon to be predicted.

With the extrapolated latent features of future frames, the system 100 for SALF may predict the locations of the action and their corresponding categories. The design of the AdamsFormer architecture 300 may be based on a neural ordinary differential equation (ODE) and modeling continuous dynamics of the latent state. The system 100 for SALF may model latent state dynamics and interpolate or extrapolates given data with captured dynamics. When solving the ODE, a multi-step method (e.g., the Adams method) may be implemented, which may be more robust to noisy conditions than single-step methods. A single-step method that uses information from only the previous step may be more easily affected by noise. In contrast, a multi-step method implemented herein may attend several previous steps to predict the future, and thus, may be robust against noise. Action videos may often include noise, such as camera motion, and using a multi-step approach to make prediction may be more robust to noise in this regard.

Spatial Action Localization in the Future (SALF)

The system 100 for SALF may predict the location of the activity that will happen for each frame in the future. Let $X_{1:t} = \{X_1, \ldots, X_t\}$ be a video with t frames. Given the first O frames of the video $X_{1:O}$, the task or goal may be to localize and classify actions in both observation and future T frames. This task may be challenging since localizing future action requires much more information than early action prediction, which predicts the action class category.

Initial Value Problem (IVP)

An initial value problem (IVP) may be an instance of the ODE with an initial condition specifying the value of the unknown function at a point. The IVP may be expressed as follows:

$$Z'(t) = \frac{dz}{dt} = f(t, z), z(t_0) = z_0 \qquad (1)$$

Numerical Methods for IVP

Obtaining an analytical solution of a differential equation may be often infeasible. In this case, approximate methods that numerically approximates the integration of derivatives with a finite sum may be utilized. Single-step methods such as Euler's method consider merely the derivative at one previous step to determine the function value at current step. Concretely, given the step size of h, $$z_{n+1} = z_n + hf(t_n, z_n) \tag{2}$$

As discussed above, multi-step methods may improve the precision of numerical approximation by considering function values from previous N(>2) steps. For example, a second-order Adams-Bashforth method may be expressed as:

$$z_{n+2} = z_{n+1} + \frac{h}{2}[3f(t_{n+1}, z_{n+1}) - f(t_n, z_n)] \tag{3}$$

The system 100 for SALF may formulate a Spatial Future Action Localization (ST-FAL) task or problem as extrapolating a latent feature of observed frames. The task may include predicting the latent feature of future frames $Z_{O+1:O+T} = \{Z_{O+1}, \ldots, Z_{O+T}\}$, by extrapolating those of initial observation $Z_{1:O} = \{Z_1, \ldots, Z_O\}$, where $Z_t$ may be latent feature of frame at time t. Thus, the frame from the time step of the video clip may be a predicted future frame. The symbol T and O may denote the length of the video prediction and the length of observation, respectively. For this, the system 100 for SALF may convert the ST-FAL task as an IVP with an initial condition as latent feature of last observed frame $z(0) = Z_O$ as follows:

$$z(t) = z(0) + \int_0^t f_\theta(\tau, z(\tau)) d\tau \tag{4}$$

AdamsFormer

To tackle SALF, the AdamsFormer architecture 300 provided may solve the IVP defined in Equation (4) with the numerical method. The system 100 for SALF may adapt the linear multistep method to solve the IVP of Equation (4), which leverages previous steps to calculate the next value, whereas the single-step method takes merely a previous step. Again, the multi-step approach may be utilized for the benefit or advantage of being more robust to the stiff equation than the single-step method. Action videos may include noise like camera motion to record the dynamic movement of action, which may make accurate action prediction more difficult. A multistep-based approach may robustly predict the future by attending multiple previous steps similar to the smoothing effect of sliding windows. The AdamsFormer architecture 300 may first utilize a video encoder to extract latent features from video clips. Next, the future feature predictor may extrapolate future features by solving the IVP with the multi-step method. Thereafter, the decoder may localize and classify the future clip's action using extrapolated future features.

Encoder

The encoder may be a video encoder and may receive a video clip as an input and produce or generate a corresponding latent feature as an output. The video clip may be received or recorded from the sensor 170, which may be an image capture device or video recorder device. The communication interface 110 of the device may transmit the video clip to the communication interface 110 of the system 100 for SALF, which may pass the video clip to the processor 102, implemented as the encoder.

To fully utilize temporal information, the processor 102 may combine features from a first neural network (e.g., 3D-convolutional neural network (CNN), any CNN, any recurrent neural network (RNN), long short term memory (LSTM) network) and a second neural network (e.g., 2D-CNN, CNN, RNN, LSTM). The input video clip at time t, $X_t \in \mathbb{R}^{H \times W \times L \times 3}$, may be passed through the 3D-CNN and the 2D-CNN and their outputs may be concatenated together to construct the latent feature $Z_t \in \mathbb{R}^{H' \times W' \times D}$ for the video clip. Here, H, W, and L may denote a height, a width, and a length or a number of frames in the video clip, respectively. For the 2D-CNN, the last frame of the video clip $X_t[:, :, -1, :]$ may be used as the input. In this regard:

$$Z_t = [Z_t^{3D} || Z_t^{2D}] W \tag{5}$$

where $W \in \mathbb{R}^{(D^{2D} + D^{3D}) \times D}$ may be a learnable linear projection matrix and $[\cdot || \cdot]$ may denote concatenation of tensor among channel dimension.

$$Z_t^{2D} \text{ and } Z_t^{3D}$$

may represent an output of the 2D-CNN and the 3D-CNN, respectively.

In this way, the processor 102 may perform feeding a frame from a time step of a video clip through an encoder to generate a latent feature which may relate to abstract information regarding actions in the scene from the video clip. The feeding the frame from the time step of the video clip through the encoder to generate the latent feature may include feeding the frame from the time step of the video clip through a 2-dimensional (2D) neural network to generate a first output, feeding the frame from the time step of the video clip through a 3-dimensional (3D) neural network to generate a second output, and concatenating the first output and the second output to generate the latent feature. The 2D neural network may be a 2D-CNN. The 3D neural network may be a 3D-CNN.

Future Feature Predictor

The processor 102 may be implemented as the future feature predictor, according to one aspect. The processor 102 may extrapolate the latent features of observed clips to each clip for the future. The processor 102 may solve Equation (4) with a numerical method, specifically a linear multi-step method, formulated as follows:

$$Z_{t+1} = Z_t + h \sum_{j=1}^m b_j F_{t-j} \tag{6}$$

where $t \le T$, $F_i$ may be output of the ODE function $f_\theta(t, Z_i)$, and m may be a number of steps for the multi-step method, and h may be a step size which may be set to 1 during initial setup. Coefficients from m-step Adams-Bashforth, may be used for b. The detailed design of the ODE function $f_\theta(t, Z_i)$ will be discussed in greater detail herein. To implement Equation (6), the system 100 for SALF may use convolution along a temporal axis of $F_{1:t}$ using b={b1, b2, ..., b_m} as a kernel and add $Z_t$ as a residual. In this regard:

$$\sum_{j=1}^m b_j F_{t-j} = (F_{1:t} * b)[t] \tag{7}$$

where symbol * may denote a convolution operator. Equation (7), may be utilized to generate a predicted future frame by recursively predicting future frames.

Ordinary Differential Equation (ODE) Function

The ODE function $f(\cdot)$ may be designed to model dynamics of latent features with a transformer decoder with causal mask. This may take all previous latent features $Z_{1:i}$ rather than merely a current frame $Z_i$. If $f(\cdot)$ merely receives the latent feature of the current video clip $Z_i$, $f(\cdot)$ may be merely dependent on the current video clip, thereby ignoring contexts of the video. For example, video clips with similar motion 'running' may be shown in many different action categories. If the $f(\cdot)$ only takes $Z_i$, $f(\cdot)$ may output similar values despite the context of the action. Therefore, to provide more contextual information of an action for modeling dynamics of latent feature, $f(\cdot)$ may be designed to capture the context of the video by feeding latent feature of one or more or all previous frames $Z_{1:i}$ as follows:

$$F_i = f_\theta(t_{1:i}, Z_{1:i}) \tag{8}$$

where $t_{1:i} = \{t_1, \ldots, t_i\}$ may be indicative of a set of all previous times until an ith time. In this way, the processor 102 may perform feeding the latent feature and one or more latent features from one or more previous time steps of the video clip through a future feature predictor to generate a cumulative information (e.g., latent tensor $Z_t$) for the time step. $f(\cdot)$ may be modeled with a neural network and self-attention may be utilized to let the model attend latent features at different times. Sinusoidal positional embedding (PE $(\cdot)$) may be added to each $Z_t$ in different time t to construct initial hidden states $$H_t^{(0)} \in \mathbb{R}^{\times H' \times W' \times D}:$$

$$H_t^{(0)} = Z_t + PE(t) \tag{9}$$

$PE(\cdot) \in \mathbb{R}^{1 \times 1 \times D}$ may be broadcasted to the spatial dimension $H'$ and $W'$. After linear projection of H, the system 100 for SALF may derive Key K, Query Q, and Value V embeddings with the same size as H for Self-Attention. Then, the system 100 for SALF may calculate temporal relations of the same spatial location (x,y) among embeddings with all different time horizons using attention which may be defined as:

$$Attn(Q, K, V)[x, y] = Softmax_j\left(\frac{Q_i[x, y]K_j[x, y]^\top}{\sqrt{D}}\right)V_j[x, y] \tag{10}$$

where spatial index $1 \leq x \leq W'$ and $1 \leq x \leq H'$. The system 100 for SALF may use multi-head attention (MSA) to explore subspaces of different representations of hidden states and apply the causal mask to make the model not attend future times. In this regard:

$$MSA(H) = [head_1 \| \ldots \| head_k]W' \tag{11}$$

$$head_i = Attn(Q^i, K^i, V^i) \tag{12}$$

where $W' \in \mathbb{R}^{D \times D}$ may be a learnable matrix. Layer-wise update rule of latent feature H may be represented by the following:

$$H^{(l+1)} = LN(MLP(H^{\prime(l)})) + H^{\prime(l)} \tag{13}$$

$$H^{\prime(l)} = LN(MSA(H^{(l)})) + H^{(l)} \tag{14}$$

where $LN(\cdot)$ may denote a layer norm. Stack L layer of the above layer, and $F_t$ may be derived by passing through $H^{(L)}$ to a linear layer.

In this way, the future feature predictor may generate the cumulative information for the time step by extrapolating the latent feature from the time step and one or more of the latent features from one or more of the previous time steps of the video clip to a future time horizon. The future feature predictor may generate the cumulative information for the time step by extrapolating the latent feature based on the ODE function. The ODE function may be modeled using self-attention or multi-head attention. The feeding the latent feature and one or more of the latent features from one or more of the previous time steps of the video clip through the future feature predictor to generate the cumulative information for the time step may include feeding all of the latent features from all of the previous time steps of the video clip through the future feature predictor.

Decoder

The decoder may take $Z_t$, derived from Equation (6), regress the action bounding box, and classify the action. Latent tensor $Z_t$ may include an extracted feature from the video clip and may be passed through a CFAM module to capture inter-channel dependencies and then a project channel to a final output channel. The final output channel may be set to the five anchors multiplied by the sum of the number of classes, the number of bounding box elements ($\{x, y, w, h\}$), and their confidence score ($5 \times (\#Class+5)$). x,y may represent Cartesian coordinates for the action bounding box or predicted action area and w, h may represent a width and a height for the associated action bounding box or predicted action area. Prior anchors may be selected by k-means for each of the datasets. In this way, the processor 102 may perform feeding the cumulative information through a decoder to generate a predicted action area and a predicted action classification associated with the predicted action area.

Training

Loss functions may be utilized to train the model. The loss function may include a localization loss and a classification loss. For action localization, Huber loss may be used for each element of the bounding box and Mean Square Error (MSE) may be used for the confidence score. Add all of them together to define localization loss:

$$\mathcal{L}_{loc} = \mathcal{L}_x + \mathcal{L}_y + \mathcal{L}_w + \mathcal{L}_h + \mathcal{L}_{conf} \tag{15}$$

Feature loss which minimizes MSE between predicted latent feature and encoded feature ($MSE(Z_t, \hat{Z}_t)$) was tested. However, performance may be slightly decreased when trained with feature loss. For action classification, Focal loss may be used:

$$\mathcal{L}_{cls} = -\sum_{i=1}^{C}(y_i(1 - \hat{y}_i)^\gamma\log(\hat{y}_i) + (1 + y)\hat{y}_i^\gamma\log(1 - \hat{y}_i)) \tag{16}$$

where C may be a number of classes, $\gamma$ may be a modulating factor of focal loss, and $y_i$ and $\hat{y}_i$ may be indicative of a one hot encoded of ground-truth action label and predicted class probability, respectively. The total loss for training may be defined as:

$$\mathcal{L}_{total} = \mathcal{L}_{dec} + \lambda \mathcal{L}_{cls} \qquad (17)$$

where $\lambda$ may be a weighting parameter for classification loss.

For training, scheduled sampling may be used following the extrapolation task of Latent ODE, that feeds in either the previously observed value $(Z_t)$ or predicted value $(\hat{Z}_t)$ with probability 0.5. For inference, values from observation $(Z_t, t\leq O)$ and predicted values for future frames $(\hat{Z}_t, O\leq t\leq T)$ may be used to localize the actions.

The processor 102 or the controller 160 may implement an action based on the predicted action area and the predicted action classification. Examples of actions may include activating a vehicle system, activating a robot system, initiating a maneuver, etc.

FIG. 2 is an exemplary flow diagram of a computer-implemented method 200 for spatial action localization in the future (SALF), according to one aspect. The computer-implemented method 200 for SALF may include feeding 202 a frame from a time step of a video clip through an encoder to generate the latent feature, feeding 204 the latent feature and one or more latent features from one or more previous time steps of the video clip through a future feature predictor to generate a cumulative information for the time step, and feeding 206 the cumulative information through a decoder to generate a predicted action area and a predicted action classification associated with the predicted action area. The processor 102 or the controller 160 may implement an action based on the predicted action area and the predicted action classification. The frame from the time step of the video clip may be a predicted future frame.

The feeding 202 the frame from the time step of the video clip through the encoder to generate the latent feature may include feeding the frame from the time step of the video clip through a 2-dimensional (2D) neural network to generate a first output, feeding the frame from the time step of the video clip through a 3-dimensional (3D) neural network to generate a second output, and concatenating the first output and the second output to generate the latent feature. The 2D neural network may be a 2D-CNN. The 3D neural network may be a 3D-CNN.

The future feature predictor may generate the cumulative information for the time step by extrapolating the latent feature from the time step and one or more of the latent features from one or more of the previous time steps of the video clip to a future time horizon. The future feature predictor may generate the cumulative information for the time step by extrapolating the latent feature based on the ODE function. The ODE function may be modeled using self-attention or multi-head attention. The feeding 204 the latent feature and one or more of the latent features from one or more of the previous time steps of the video clip through the future feature predictor to generate the cumulative information for the time step may include feeding all of the latent features from all of the previous time steps of the video clip through the future feature predictor.

FIG. 3 is an exemplary architecture 300 in associated with the component diagram of the system 100 for spatial action localization in the future (SALF) of FIG. 1, according to one aspect. The architecture 300 provided in FIG. 3 may be referred to as AdamsFormer architecture 300 herein. The AdamsFormer architecture 300 may receive an input 302 of a video feed including a plurality of frames. A frame from a time step of the video clip may be fed through an encoder 310 to generate a latent feature 312. The latent feature 312 and one or more latent features from one or more previous time steps of the video clip may be fed through a future feature predictor 320 to generate a cumulative information 322 for the time step. The cumulative information 322 may be fed through a decoder 330 to generate an output 350 including a predicted action area 354 and a predicted action classification 352 associated with the predicted action area 354.

FIG. 4 is an exemplary architecture 400 in associated with the component diagram of the system 100 for spatial action localization in the future (SALF) of FIG. 1, according to one aspect. As seen in FIG. 4, the latent feature 312 and one or more latent features from one or more previous time steps of the video clip may be fed through the future feature predictor 320 to generate the cumulative information 322 for the time step. One or more of a layer norm 410, a multi-head attention 420, or a multi-layer perceptron (MLP) 430 may be implemented within the future feature predictor 320.

Figure 5:
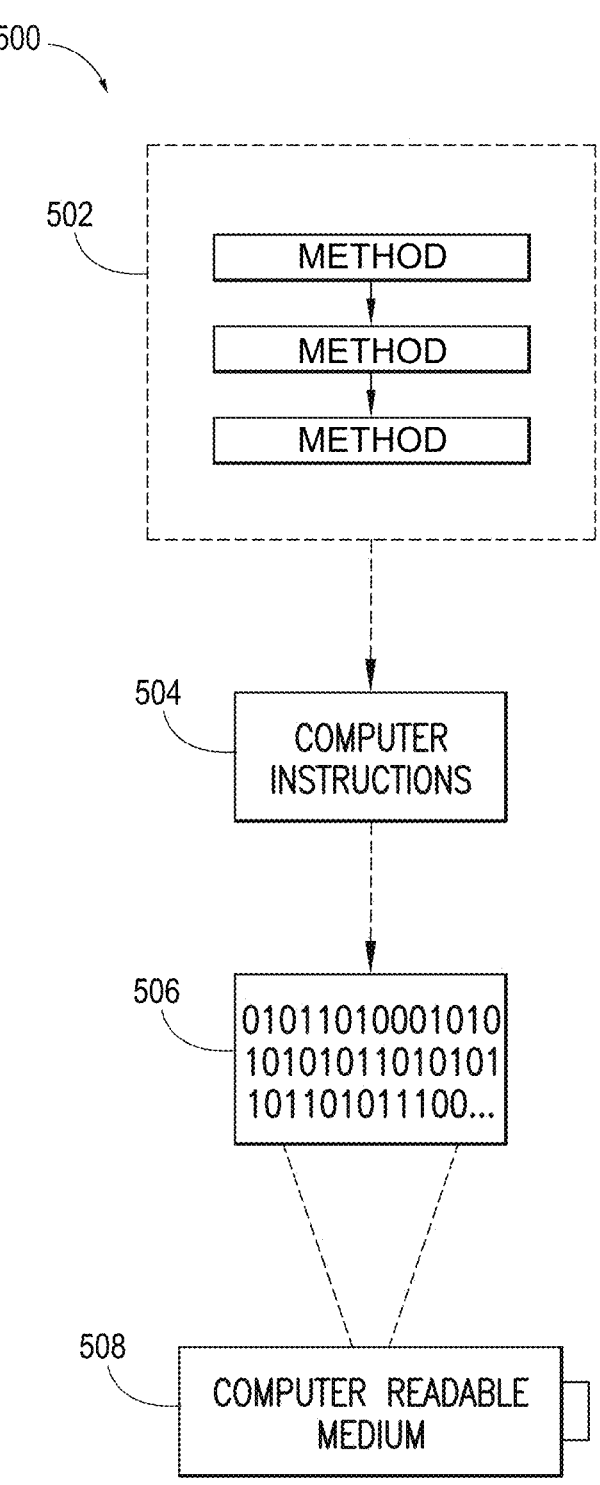
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the computer-implemented method 200 of FIG. 2. In another aspect, the processor-executable computer instructions 504 may be configured to implement a system, such as the system for spatial action localization in the future (SALF) of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
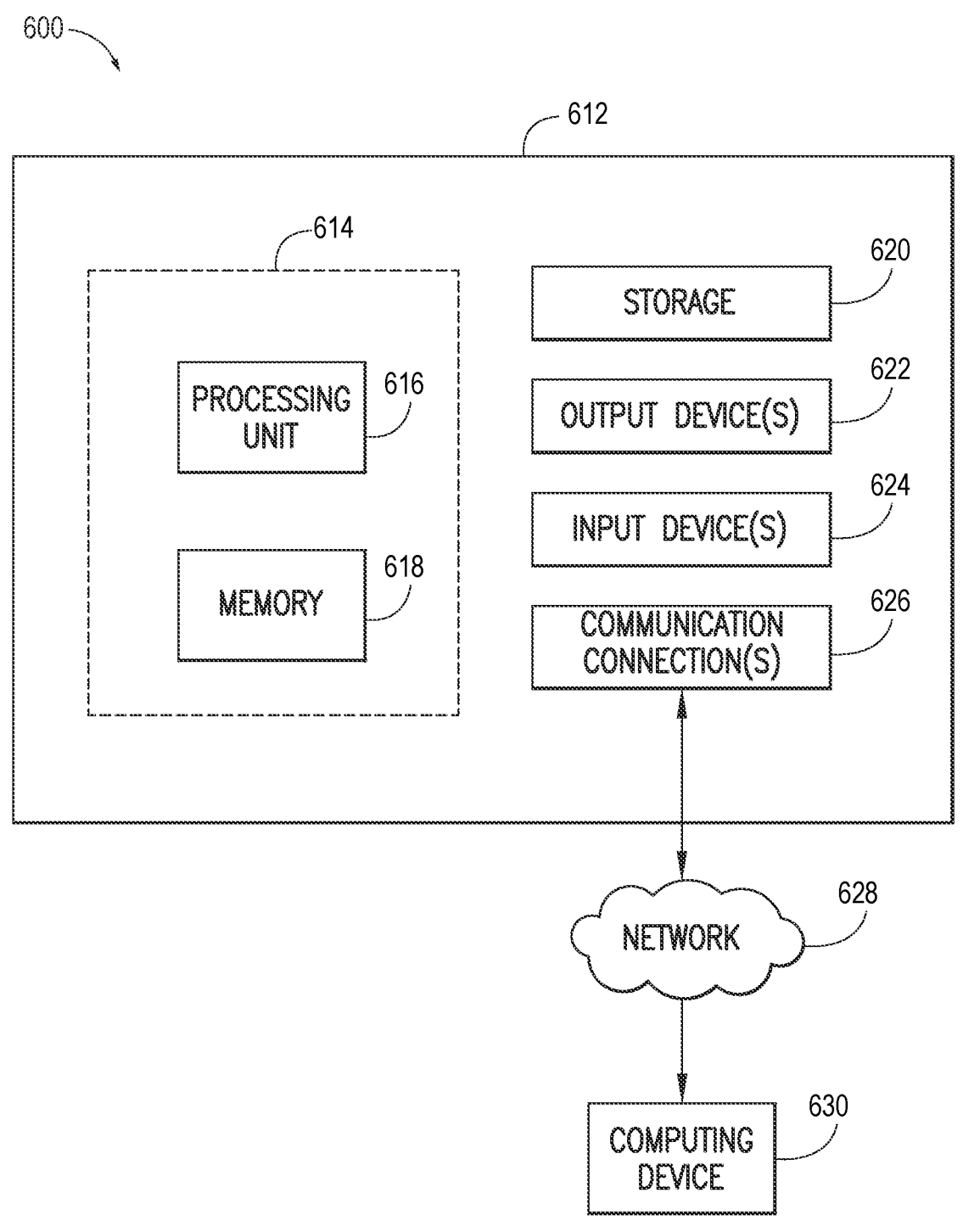
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by the at least one processing unit 616, for example.

The term "computer readable media" as used herein includes computer storage media. Computer storage media includes volatile and nonvolatile, removable, and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. A system for spatial action localization in the future (SALF), comprising:
a memory storing one or more instructions; and
a processor executing one or more of the instructions stored on the memory to perform:
feeding a frame from a time step of a video clip through an encoder to generate a latent feature;
feeding the latent feature and one or more latent features from one or more previous time steps of the video clip through a future feature predictor to generate a cumulative information for the time step by extrapolating the latent feature based on an ordinary differential equation (ODE) function modeled using self-attention and a causal mask or multi-head attention and the causal mask and wherein the ODE function considers function values from multiple previous steps; and
feeding the cumulative information through a decoder to generate a predicted action area and a predicted action classification associated with the predicted action area.

2. The system for SALF of claim 1, wherein the feeding the frame from the time step of the video clip through the encoder to generate the latent feature includes:
feeding the frame from the time step of the video clip through a 2-dimensional (2D) neural network to generate a first output;
feeding the frame from the time step of the video clip through a 3-dimensional (3D) neural network to generate a second output; and
concatenating the first output and the second output to generate the latent feature.

3. The system for SALF of claim 2, wherein the 2D neural network is a 2D convolutional neural network (CNN).

4. The system for SALF of claim 2, wherein the 3D neural network is a 3D convolutional neural network (CNN).

5. The system for SALF of claim 1, wherein the future feature predictor generates the cumulative information for the time step by extrapolating the latent feature from the time step and one or more of the latent features from one or more of the previous time steps of the video clip to a future time horizon.

6. The system for SALF of claim 1, wherein the feeding the latent feature and one or more of the latent features from one or more of the previous time steps of the video clip through the future feature predictor to generate the cumulative information for the time step includes feeding all of the latent features from all of the previous time steps of the video clip through the future feature predictor.

7. The system for SALF of claim 1, wherein the frame from the time step of the video clip is a predicted future frame.

8. The system for SALF of claim 1, wherein the processor implements an action based on the predicted action area and the predicted action classification.

9. A computer-implemented method for spatial action localization in the future (SALF), comprising:
feeding a frame from a time step of a video clip through an encoder to generate a latent feature;
feeding the latent feature and one or more latent features from one or more previous time steps of the video clip through a future feature predictor to generate a cumulative information for the time step by extrapolating the latent feature based on an ordinary differential equation (ODE) function modeled using self-attention and a causal mask or multi-head attention and the causal mask and wherein the ODE function considers function values from multiple previous steps; and feeding the cumulative information through a decoder to generate a predicted action area and a predicted action classification associated with the predicted action area.

10. The computer-implemented method for SALF of claim 9, wherein the feeding the frame from the time step of the video clip through the encoder to generate the latent feature includes:
feeding the frame from the time step of the video clip through a 2-dimensional (2D) neural network to generate a first output;
feeding the frame from the time step of the video clip through a 3-dimensional (3D) neural network to generate a second output; and
concatenating the first output and the second output to generate the latent feature.

11. The computer-implemented method for SALF of claim 10, wherein the 2D neural network is a 2D convolutional neural network (CNN).

12. The computer-implemented method for SALF of claim 10, wherein the 3D neural network is a 3D convolutional neural network (CNN).

13. The computer-implemented method for SALF of claim 9, wherein the future feature predictor generates the cumulative information for the time step by extrapolating the latent feature from the time step and one or more of the latent features from one or more of the previous time steps of the video clip to a future time horizon.

14. A system for spatial action localization in the future (SALF), comprising:
a memory storing one or more instructions;
a processor executing one or more of the instructions stored on the memory to perform:
feeding a frame from a time step of a video clip through an encoder to generate a latent feature;
feeding the latent feature and one or more latent features from one or more previous time steps of the video clip through a future feature predictor to generate a cumulative information for the time step by extrapolating the latent feature based on an ordinary differential equation (ODE) function modeled using self-attention and a causal mask or multi-head attention and the causal mask and wherein the ODE function considers function values from multiple previous steps; and
feeding the cumulative information through a decoder to generate a predicted action area and a predicted action classification associated with the predicted action area; and
a controller controlling an actuator to implement an action based on the predicted action area and the predicted action classification.

15. The system for SALF of claim 14, wherein the feeding the frame from the time step of the video clip through the encoder to generate the latent feature includes:
feeding the frame from the time step of the video clip through a 2-dimensional (2D) neural network to generate a first output;
feeding the frame from the time step of the video clip through a 3-dimensional (3D) neural network to generate a second output; and
concatenating the first output and the second output to generate the latent feature.

16. The system for SALF of claim 15, wherein the 2D neural network is a 2D convolutional neural network (CNN).

17. The system for SALF of claim 15, wherein the 3D neural network is a 3D convolutional neural network (CNN).

* * * * *